Jan. 31, 1939.　　　　D. S. FAHRNEY　　　　2,145,253
AIR COOLED IN-LINE ENGINE
Filed Jan. 19, 1938　　　2 Sheets-Sheet 1

INVENTOR
DELMER S. FAHRNEY
BY
ATTORNEY

Jan. 31, 1939.　　　　D. S. FAHRNEY　　　　2,145,253
AIR COOLED IN-LINE ENGINE
Filed Jan. 19, 1938　　　2 Sheets-Sheet 2

INVENTOR
DELMER S. FAHRNEY
BY
ATTORNEY

Patented Jan. 31, 1939

2,145,253

UNITED STATES PATENT OFFICE 2,145,253

AIR COOLED IN-LINE ENGINE

Delmer S. Fahrney, United States Navy

Application January 19, 1938, Serial No. 185,675

2 Claims. (Cl. 244—55)

(Granted under the act of March 3, 1883, as amended April 30, 1928; 370 O. G. 757)

This invention relates to an air cooled in-line engine, particularly intended for use on aircraft, and has for an object to provide an in-line engine either of the straight type or of the V type which may be cooled by air instead of necessitating liquid cooling means, as customary.

A further object of this invention is to provide a means for controlling the amount of air cooling to which the in-line engine of this invention is exposed.

A further object of this invention is to provide an air cooled in-line engine which may be mounted either horizontally or vertically, and likewise may be mounted in multiple units, geared together either for operating a single propeller or for operating a pair of twin propellers revolving in adjacent planes.

With the foregoing and other objects in view, the invention consists in the construction, combination and arrangement of parts hereinafter described and illustrated in the drawings, in which, Fig. 1 is a top elevational view of an installation of this invention in the leading edge of an aircraft wing, partly broken away;

There is shown at 10 an aircraft wing provided with the usual box spar 11 adjacent its leading edge 12. An in-line engine 13, shown as being of the V type, is mounted on a bracket 14 secured to the box spar 11, the space in the box spar 11 being utilized as a protective passage for the fuel lines, oil lines, engine controls, etc., to the engine.

Figure 1:
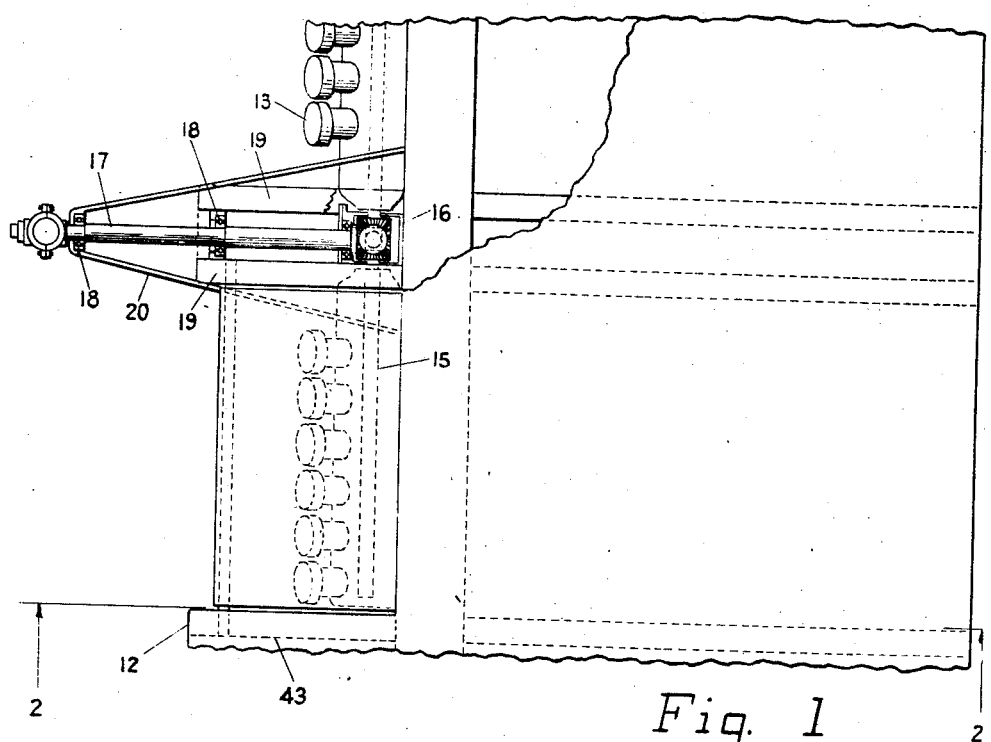
Figure 2:
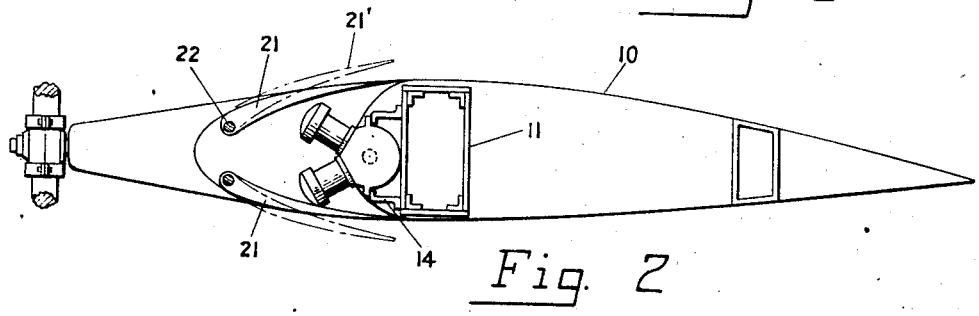
Fig. 2 is a sectional view on line 2—2 of Fig. 1.

As shown in Fig. 1, a pair of engines 13 are mounted with their crankshafts 15 operating a common differential gearing 16 on a propeller shaft 17 journaled in bearings 18, secured in brackets 19 and tubular struts 20. Cowling flaps 21 fixed on shafts 22 are journaled in brackets 19 and wing strut 43 within the leading edge 12, the cowlings on one of the engines being omitted in Fig. 1 for clarity of illustration.

Suitable remote control means, not shown, may be provided for regulating the degree of opening of the flaps 21 in the directions of the positions 21', so as to regulate the amount of air that may flow over the engines 13 to cool them.

Figure 3:
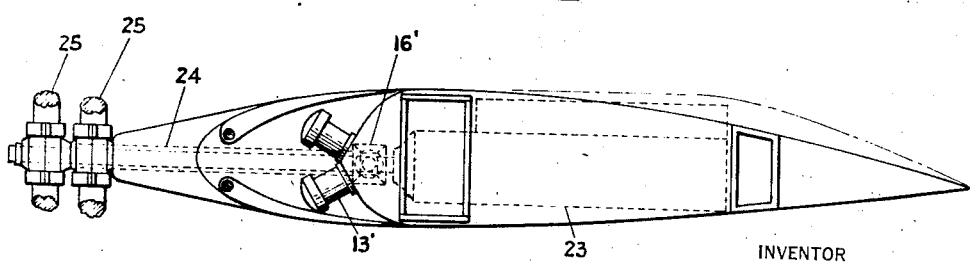
Fig. 3 shows a view similar to Fig. 2 of another adaptation of this invention.

In Fig. 3 a water cooled in-line engine 23 has been shown behind the differential gear box 16', and power from the air cooled engine 13' and water cooled engine 23 is conducted through the concentric shafts 24 to the twin propellers 25.

Figure 5:
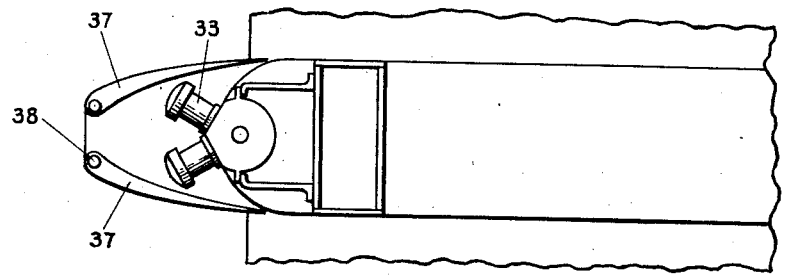
Fig. 5 is a sectional view on line 5—5 of Fig. 4.
Figure 4:
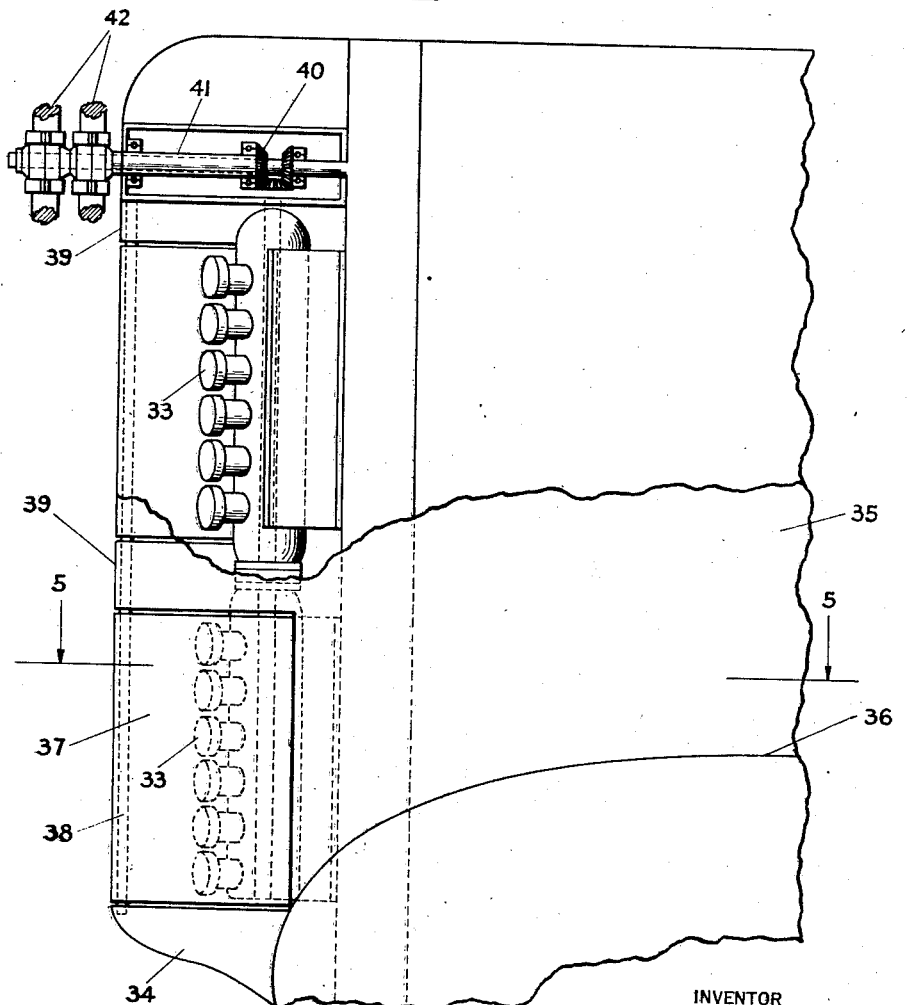
Fig. 4 is an elevational view of a vertical installation of this invention.

In Figs. 4 and 5 the engines 33 are shown as being mounted in the leading edge 34 of a vertical strut 35, the aircraft wing being shown at 36. In this case the cowlings 37 are mounted on shafts 38 journaled in suitably positioned brackets 39. In this case both engines 33 are shown as being mounted below the propeller gearing 40 to the propeller shafts 41 and twin propellers 42.

As a result of this invention air cooled in-line engines may be provided in horizontal or vertical arrangement on aircraft of any size, and in large aircraft the several types of mountings may be used simultaneously in conjunction with liquid cooled engines as well. In the air cooled engine the space between the forward edges of the cowlings provides the leading opening for the air to reach the engine. By opening the cowlings the air is permitted to escape from the engines more rapidly, and hence may enter the leading opening more rapidly.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In combination, an air cooled in-line engine mounted on a leading edge of an aircraft, and cowling means for controlling cooling air to the engine, said cowling means comprising a pair of cowling flaps, each flap being journaled at its leading edge forward of the engine, the leading edges of the cowling flaps being spaced apart to provide an air entrance, said cowling flaps overlying said engine on opposite sides thereof.

2. In combination, an air cooled in-line engine mounted on a leading edge of an aircraft, and cowling means for controlling cooling air to the engine, said cowling means comprising a pair of cowling flaps, each flap being journaled at its leading edge forward of the engine, the leading edges of the cowling flaps being spaced apart to provide an air entrance, said cowling flaps overlying said engine, said overlying edges being movable away from said engines to increase the air exit therefrom.

DELMER S. FAHRNEY.